United States Patent
Liang et al.

(10) Patent No.: US 10,199,910 B2
(45) Date of Patent: Feb. 5, 2019

(54) MOTOR CORE FORMED FROM A SINGLE STEEL SOURCE AND HAVING SEPARATELY PROCESSED ROTOR AND STATOR LAMINATIONS

(71) Applicant: Ford Global Technologies, LLC, Dearborn, MI (US)

(72) Inventors: Feng Liang, Troy, MI (US); Leyi Zhu, Novi, MI (US); C Bing Rong, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 149 days.

(21) Appl. No.: 14/505,790

(22) Filed: Oct. 3, 2014

(65) Prior Publication Data
US 2016/0099635 A1   Apr. 7, 2016

(51) Int. Cl.
*H02K 15/02*   (2006.01)
(52) U.S. Cl.
CPC .................................. *H02K 15/02* (2013.01)
(58) Field of Classification Search
CPC ............ H02K 15/02; H02K 1/20; H02K 9/06; H02K 1/146; H02K 7/14; Y10S 174/20
See application file for complete search history.

(56) References Cited

U.S. PATENT DOCUMENTS

| | | | | |
|---|---|---|---|---|
| 4,234,360 A | * | 11/1980 | Frischmann | C21D 1/04 148/121 |
| 5,193,266 A | * | 3/1993 | Caputo | H02K 1/278 29/598 |
| 6,007,642 A | * | 12/1999 | Gallo | C21D 8/1222 148/111 |
| 6,724,119 B1 | | 4/2004 | Wellisch | |
| 7,754,030 B2 | * | 7/2010 | Okitsu | C21D 8/02 148/320 |
| 2004/0149355 A1 | * | 8/2004 | Kohno | C21D 8/12 148/111 |
| 2006/0066169 A1 | | 3/2006 | Daugherty et al. | |
| 2007/0151630 A1 | * | 7/2007 | Iorio | C22C 38/08 148/120 |
| 2007/0241629 A1 | | 10/2007 | Ionel et al. | |
| 2008/0191578 A1 | | 8/2008 | Greigg et al. | |

(Continued)

*Primary Examiner* — Minh Trinh
(74) *Attorney, Agent, or Firm* — David B. Kelley; Brooks Kushman P.C.

(57) ABSTRACT

Methods for forming a motor core having separately processed stator and rotor laminations are disclosed. The stator and rotor laminations may be formed from a single electrical steel source, such as a sheet or coil. The methods may include forming and heat treating a first portion of the steel source to form stator laminations having a first microstructure (e.g., mean grain size) and magnetic and mechanical properties (e.g., core loss). They may further include forming and heat treating a second portion of the steel source to form rotor laminations having a second microstructure that is different from the first and magnetic and mechanical properties that are different from the stator laminations. The stator laminations may have improved core loss and permeability performance and the rotor laminations may have improved mechanical properties. By separating the processing, each core may have properties tailored to conditions that they will experience in operation.

15 Claims, 4 Drawing Sheets

(56) References Cited

U.S. PATENT DOCUMENTS

| | | | |
|---|---|---|---|
| 2009/0045689 A1 | 2/2009 | Haruno et al. | |
| 2009/0277547 A1* | 11/2009 | Saito | C21D 1/25 148/661 |
| 2010/0252151 A1* | 10/2010 | Furrer | C21D 1/00 148/714 |
| 2013/0000794 A1* | 1/2013 | Pieper | C22C 30/00 148/522 |
| 2013/0154434 A1* | 6/2013 | Hasegawa | H02K 1/16 310/216.004 |
| 2014/0250681 A1* | 9/2014 | Johnston | H02K 15/02 29/602.1 |

* cited by examiner

MOTOR CORE FORMED FROM A SINGLE STEEL SOURCE AND HAVING SEPARATELY PROCESSED ROTOR AND STATOR LAMINATIONS

TECHNICAL FIELD

The present disclosure relates to electric motor cores wherein the rotor and stator laminations or rotor and stator cores are formed or processed separately.

BACKGROUND

The need for motors that are compact, high-efficiency, and high performance has greatly increased in recent years due to the increasingly higher fuel economy requirements for electric vehicles (e.g., hybrid, plug-in hybrid, and fully electric vehicles). As a result, there is an increased demand for high performance rotor and stator laminations used in motor cores of electric vehicles that can efficiently and effectively convert energy. In the conventional motor core manufacturing process, rotor and stator laminations are formed from the same electrical steel sheet and undergo the same processing steps, which results in identical property characteristics for the rotor and stator laminations.

SUMMARY

In at least one embodiment, a method for forming a motor core from a single electrical steel source is provided. The method may include forming and heat treating a first portion of the steel source to form stator laminations having a first microstructure (e.g., mean grain size) and magnetic properties (e.g., core loss), and forming and heat treating a second portion of the steel source to form rotor laminations having a second microstructure and magnetic properties that are different from the first. The mean grain size may be less than the first microstructure and the core loss may be greater than in the stator laminations. In one embodiment, the forming of the stator and rotor laminations includes punching stator and rotor laminations from the electrical steel source.

The stator heat treatment step may be carried out at a stator heat treatment temperature and the rotor heat treatment step may be carried out at a rotor heat treatment temperature. In one embodiment, the stator heat treatment temperature may be higher than the rotor heat treatment temperature. The stator heat treatment step may be held at the stator heat treatment temperature for a total time period greater than a total time period that the rotor heat treatment temperature is held. The rotor heat treatment may have a larger cooling rate than that of the stator heat treatment.

In one embodiment, the method may further include increasing a silicon content of at least one of the stator and rotor laminations, which may be during the stator and/or rotor heat treatments or during an additional heat treatment. The silicon content may be increased in only a portion of each stator or rotor lamination. In one embodiment, the silicon content is increased in one or more stator teeth of the stator laminations.

The stator heat treatment step may be performed on only a portion of each stator lamination. In one embodiment, the stator heat treatment step is performed on one or more stator teeth of the stator laminations. The rotor heat treatment step may be performed on only a portion of each rotor lamination. In one embodiment, the second core loss is greater than the first core loss at the same magnetic field strength and frequency. The stator heat treatment step may form stator laminations having a first mean grain size of 50-250 µm and the rotor heat treatment step may form rotor laminations having a second mean grain size of 1-100 µm.

In at least one embodiment, a method for forming a motor core from a single electrical steel source is provided. The method may include forming and heat treating a first portion of the steel source to form stator laminations having a first mean grain size, and forming and heat treating a second portion of the steel source to form rotor laminations having a second mean grain size of 1-100 µm that is less than the first mean grain size.

In one embodiment, the stator heat treatment step forms stator laminations having a lower core loss than the rotor laminations and the rotor heat treatment step forms rotor laminations having a higher yield strength than the stator laminations. The method may further include increasing a silicon content of at least one of the stator and rotor laminations. In another embodiment, the stator heat treatment step is performed on only a portion of each stator lamination or the rotor heat treatment step is performed on only a portion of each rotor lamination.

In at least one embodiment, a method for forming a motor core is provided, including forming a plurality of stator and rotor laminations from a single electrical steel sheet. The method may further include heat treating a selected region of each stator lamination to have a smaller core loss than a remainder of the stator lamination, and heat treating the rotor laminations to form a rotor mean grain size that is less than a stator mean grain size in the stator laminations. The method may further include increasing a silicon content of at least one of the stator and rotor laminations. In one embodiment, the rotor heat treatment step is performed on only a portion of each rotor lamination.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
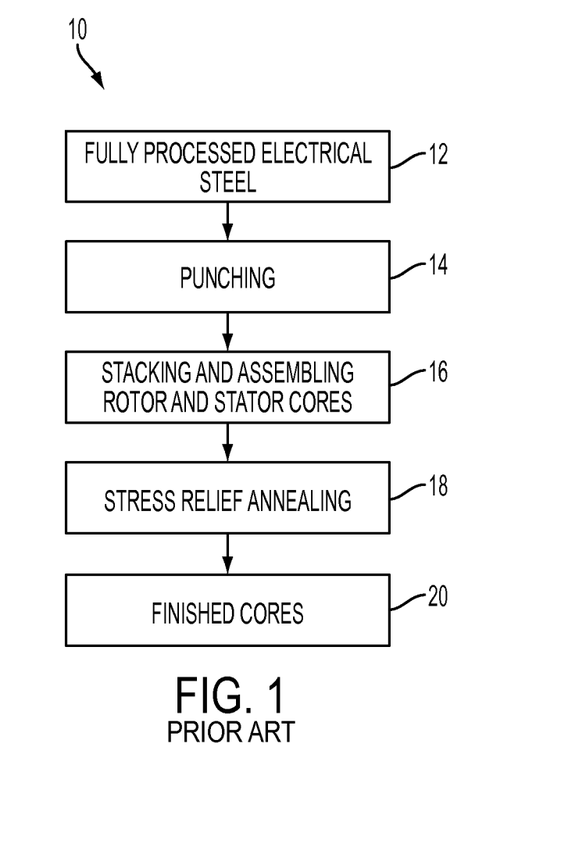
FIG. 1 is a flow diagram of the conventional manufacturing process of rotor and stator cores.

In the conventional motor core manufacturing process, which is illustrated in FIG. 1, rotor and stator laminations are punched from the same electrical steel sheet and identically processed. This results in the rotor and stator laminations having identical property characteristics. However, high performance motors have different magnetic property requirements for rotor and stator laminations, such as permeability and loss, and different mechanical property requirements, such as yield strength. For example, motor power may be increased by increasing motor speed. Increased motor speed may require a rotor lamination having a high yield strength. In contrast, high yield strength is not necessary for a stator lamination in a high-speed motor, due to it being stationary.

The conventional manufacturing process that includes using the same electrical steel material for both the rotor and stator laminations leads to a compromise in the performance of both the rotor and stator. Accordingly, the potential of premier electrical steels has not yet been fully utilized. A flowchart of the conventional manufacturing process 10 of a rotating electric machine motor core is shown in FIG. 1. The process 10 begins with fully processed electrical steel received from the steel mill at step 12, which has fully developed and specified magnetic properties, as well as the desired thickness and physical form. At step 14, the rotor and stator laminations are formed from the same electrical steel sheet by a die punch. The rotor and stator laminations, pre-coated with insulating layers, are then stacked and assembled at step 16 to form stator and rotor cores. The punching process may include strong shearing at the cutting edge, which may result in plastic deformation. Since plastic strain generally affects magnetic properties adversely, stress relief annealing (SRA) may be performed on the motor cores at step 18 to reduce or eliminate plastic deformation, thereby improving motor performance. Following the SRA heat treatment, the rotor and stator cores are completed at step 20.

The conventional manufacturing process 10, in which the rotor and stator laminations are formed from one electrical steel sheet and undergo the same processing, leads to the sacrifice and compromise of the optimal properties for each of the rotor and stator laminations. Motor performance includes different requirements for rotor and stator lamination properties. For example, rotor and stator laminations may have different magnetic property requirements, such as permeability ($\mu$) and loss (P), and may have different mechanical property requirements, such as yield strength ($Y_s$). In addition, the processing conditions that may optimize one property often work adversely to another.

Therefore, the conventional production process 10 that includes treating rotor and stator laminations identically and simultaneously is unable to achieve their respective optimal properties. For example, rotor laminations have a higher mechanical strength requirement than stator laminations, but a relatively lower loss requirement. Since reducing loss and enhancing mechanical strength are generally incompatible by tuning grain size, using the conventional process 10 requires that a concession must be made for either yield strength or loss. Typically, the high yield strength requirement for rotor laminations is compromised in order to meet the more important low loss requirement for stator laminations. This compromise limits the maximum rotation speed of the rotor and, therefore, the performance of the motor.

In at least one embodiment, a manufacturing process is provided that separates or splits the processing of rotor and stator laminations/cores. By separating the processing of the rotor laminations and the stator laminations, the magnetic and mechanical properties can be optimized for each core type. The separate processing may allow for different heat treatments, coatings, alloying processes, or other processes to be performed and tailored to the lamination type. In general, the rotor processing may be configured to optimize yield strength, while also minimizing loss and increasing permeability. Stator processing may be configured to minimize loss and increase permeability, with less emphasis on mechanical properties.

Figure 2:
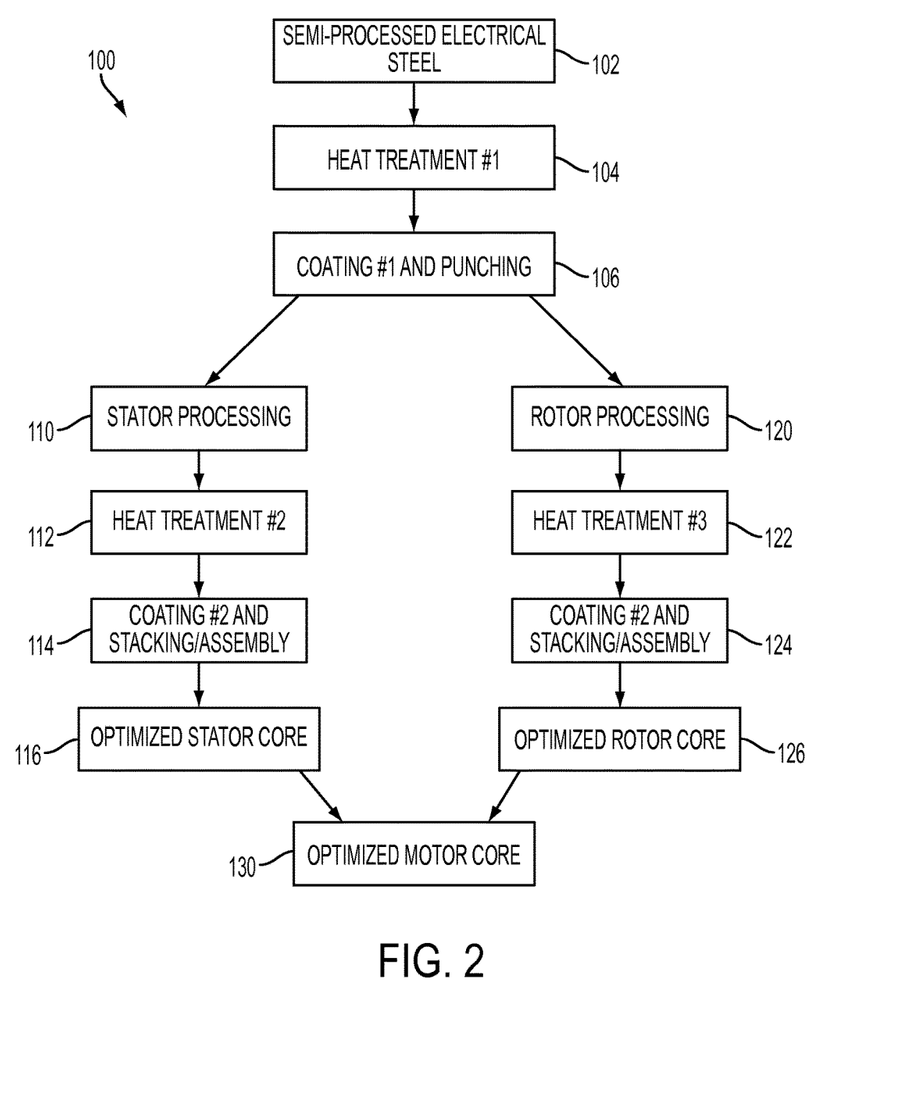
FIG. 2 is a flow diagram of a split manufacturing process for separately processing rotor and stator laminations, according to an embodiment.

With reference to FIG. 2, an embodiment of a manufacturing process 100 with separate processing of the rotor and stator is disclosed. The process begins at step 102 where semi-processed electrical steel is provided. This step is in contrast to the conventional manufacturing process, where fully processed electrical steel is received from a supplier and immediately punched into laminations. As used herein, "semi-processed" means that one or more additional steps are required before the electrical steel acquires its final magnetic properties or quality. For example, a heat treatment, such as annealing, may be required to fully process the electrical steel for use in a motor core. The semi-processed electrical steel in step 102 may have been previously processed to have the desired thickness and may be in the desired physical form, such as sheets or coils.

At step 104, a heat treatment process may be performed on the semi-processed electrical steel. This heat treatment process may reduce the hardness of the electrical steel, thereby increasing the punching quality of the steel and prolonging the life of the punching tools. The heat treatment may be done in a protective gas (e.g., nitrogen or inert gas) or vacuum environment. The heat treatment may be in the temperature range of 500-1100° C., or any sub-range therein, and may last for an extended period of time. The heat treatment temperature may be a holding temperature and the heat treatment time may be the time at which the steel is held at the holding temperature or it may be the total time of the heat treatment process (e.g., including any temperature ramp up and ramp down). The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used. After the heat treatment, the steel may be slowly cooled to achieve an ending hardness that is suitable or optimal for punching.

After the heat treatment, the softened electrical steel is punched into rotor and stator laminations at step 106. To improve the quality of the punching process and/or to prolong the lifetime of the punching tools, a coating may be applied to the electrical steel prior to the punching operation. In one embodiment, the coating may be a high temperature compatible lubricant with good electrical insulation. However, any coating with good lubrication may also be used in this step. The punching process may be configured to compensate for dimensional changes that may occur due to later additional processing, such as deformation due to heat treatment. Since the stator and rotor laminations may be formed from the same semi-processed electrical steel in step 102, in at least one embodiment the stator and rotor laminations may have the same thickness and the same initial composition.

Following the punching process, the processing of the stator and rotor laminations is split into separate stator processing 110 and rotor processing 120. The stator processing 110 may focus primarily on optimizing core loss (P) and permeability ($\mu$) properties. As described above, mechanical properties, such as yield strength, may not be as important for stator laminations since the stator is stationary. At step 112, a second heat treatment process is performed on the stator laminations only (e.g., stator heat treatment). The second heat treatment may have several purposes. First, the second heat treatment is configured to result in a microstructure (e.g. mean grain size, grain texture) in the electric steel that will reduce or minimize core loss (P) and improve or maximize permeability ($\mu$). In at least one embodiment, the second heat treatment is configured to provide a mean grain size of 10 to 300 µm, or any sub-range therein, such as 50 to 250 µm or 75 to 200 µm. The optimum grain size may depend on the application and the conditions in which the laminations are used, since core loss has a non-monotonic dependence on grain size. The optimum grain size to minimize core loss is frequency and flux density dependent, due to the competition of the two loss terms: hysteresis and excess loss. In one embodiment, the mean grain size of the electrical steel may be from 50 to 100 µm. In another embodiment, the mean grain size may be from 100 to 150 µm. For example, for a frequency of 60 Hz and a flux density of 1.5 T, the optimal grain size for reduced core loss is 150 µm, while for a frequency of 400 Hz and a flux density of 1 T, the optimal size is 84 µm.

In addition to providing a microstructure that reduces core loss and enhances permeability, the second heat treatment may also decarburize the electric steel (e.g., if the heat treatment is performed in decarburizing environment, such as a hydrogen and water vapor mixture) and/or reduce or eliminate residual stress. The heat treatment may be done in a protective gas (e.g., nitrogen or inert gas) or vacuum environment or decarburizing environment. The heat treatment may be in the temperature range of 500-1100° C., or any sub-range therein, and may last for an extended period of time. The heat treatment temperature may be a holding temperature and the heat treatment time may be the time at which the steel is held at the holding temperature or it may be the total time of the heat treatment process (e.g., including any temperature ramp up and ramp down). The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used. A cooling rate may be chosen to reduce or minimize deformation or warping of the single lamination sheet while obtaining improved magnetic properties. As described above, the ending microstructure may depend on the design and working conditions of the motor and may be optimized to minimize core loss and maximize permeability.

After the second heat treatment, the stator laminations may be stacked together at step 114 to form the stator core. An insulating material may be disposed between the laminations to reduce eddy current losses, for example, if the coating applied in step 106 cannot tolerate the high temperature annealing in step 112. The insulating material may be applied as a coating prior to the stacking of the laminations. Suitable insulating materials include those with good electrical insulation and anti-corrosion properties. The stacked and assembled stator laminations together form a finished, optimized stator core at step 116. The finished stator core lamination has improved properties compared to a conventionally processed lamination, for example, core loss at 1.0 T, 400 Hz may be less than 15 W/kg, flux density at 5 kA/m may be larger than 1.5 T and yield strength may be larger than 350 MPa.

The rotor processing 120 may focus primarily on optimizing yield strength ($Y_s$), while also improving or maintaining core loss (P) and permeability ($\mu$) properties. As described above, mechanical properties, such as yield strength, may be more important for rotor laminations since the rotor rotates at high speeds. As described above, electric motor power may be increased by increasing motor speed, and high motor speeds require rotors with higher yield strength. At step 122, a third heat treatment process is performed on the rotor laminations only (e.g., rotor heat treatment). In at least one embodiment, the third heat treatment 122 is different from the second heat treatment 112 (e.g., different temperature and/or time). The third heat treatment may have several purposes. First, the third heat treatment is configured to result in a microstructure (e.g., mean grain size and grain texture) in the electric steel that will improve the yield strength of the rotor laminations. In at least one embodiment, the third heat treatment is configured to provide a mean grain size of 100 µm or less. For example, the mean grain size of the electrical steel may be from 1 to 100 µm, 10 to 100 µm, 25 to 100 µm, 25 to 75 µm, or 25 to 50 µm. The optimal value may reflect a balance between core loss and yield strength requirements. Smaller grain sizes will generally result in increased yield strength, but may increase core loss. In contrast, larger grain sizes will generally result in reduced yield strength, but reduced core loss.

In addition to providing a microstructure that improves yield strength, the third heat treatment may also decarburize the electric steel (e.g., if the heat treatment is performed in decarburizing environment, such as a hydrogen and water vapor mixture) and/or reduce or eliminate residual stress. The heat treatment can be done in a protective gas (e.g., nitrogen or an inert gas) or vacuum or decarburizing environment. The heat treatment may have a temperature range of 500-1100° C. and may last for an extended period of time. The heat treatment temperature may be a holding temperature and the heat treatment time may be the time at which the steel is held at the holding temperature or it may be the total time of the heat treatment process (e.g., including any temperature ramp up and ramp down). The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used.

In at least one embodiment, the third heat treatment 122 may be performed at a lower temperature and/or for a shorter time compared to heat treatment 112 for the stator laminations. The heat treatment 122 may therefore be configured to provide a smaller mean grain size in the rotor laminations, compared to the stator laminations, resulting in better mechanical properties (e.g., yield strength). In contrast, the heat treatment 112 may be performed at a higher temperature and/or for a longer time compared to heat treatment 122. Heat treatment 112 may therefore be configured to provide a larger mean grain size in the stator laminations, resulting in improved loss performance. A larger cooling rate may be chosen for the rotor laminations, compared to the stator laminations, to improve the mechanical and magnetic properties while minimizing deformation or warping of the single lamination sheet. The final microstructure may depend on the design and working conditions of the motor and may be optimized to maximize mechanical properties.

After the third heat treatment, the rotor laminations may be stacked together at step 124 to form the rotor core. An insulating material may be disposed between the laminations to reduce eddy current losses if the coating applied in step 106 cannot tolerate the high temperature annealing in step 122. The insulating material may be applied as a coating prior to the stacking of the laminations. Suitable insulating materials may include those with good electrical insulation and anti-corrosion properties. The insulating materials for the rotor and stator may be the same or they may be different. The stacked and assembled rotor laminations together form a finished, optimized rotor core at step 126. The finished rotor core lamination has improved properties compared to a conventionally processed lamination, for example, core loss at 1.0 T, 400 Hz may be less than 15 W/kg, flux density at 5 kA/m may be larger than 1.5 T and yield strength may be larger than 350 MPa.

At step 130, the optimized stator core and the optimized rotor core may be combined to form an optimized motor core. As described above, the stator and rotor laminations may be separately processed such that they are optimized for a specific motor application and operating conditions. For example, the laminations in the stator core may have a larger grain mean size than the rotor laminations, which may improve the loss performance of the stator. The laminations in the rotor core may have a smaller mean grain size than the stator laminations, which may improve the yield strength of the rotor. The mean grain sizes described above may be throughout the entire lamination or core if the heat treatments are applied to the entire lamination or core. Loss or loss performance may be compared under the same or similar conditions, such as flux density and frequency.

Figure 3:
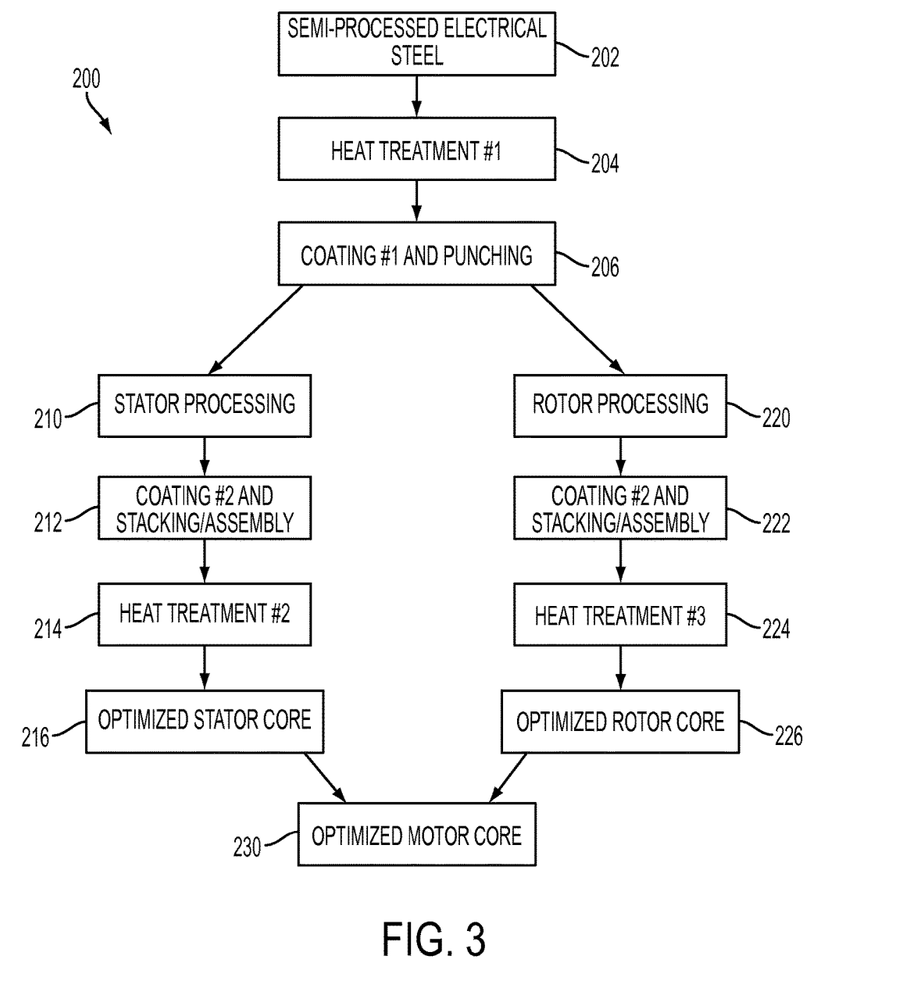
FIG. 3 is a flow diagram of a split manufacturing process for separately processing rotor and stator cores, according to another embodiment.

With reference to FIG. 3, another embodiment of a manufacturing process 200 with separate processing of the rotor and stator is disclosed. The process begins at step 202 where semi-processed electrical steel is provided. As described above, this step is in contrast to the conventional manufacturing process, where fully processed electrical steel is received from a supplier and immediately punched into laminations. At step 204, a heat treatment process may be performed on the semi-processed electrical steel. This heat treatment process may reduce the hardness of the electrical steel, thereby increasing the punching quality of the steel and/or prolonging the life of the punching tools. The heat treatment may be done in a protective gas (e.g., nitrogen or inert gas) or vacuum environment. The heat treatment may be in the temperature range of 500-1100° C., or any sub-range therein, and may last for an extended period of time. The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used. The steel may then be slowly cooled to achieve an ending hardness that is suitable or optimal for punching.

After the heat treatment, the softened electrical steel is punched into rotor and stator laminations at step 206. To improve the quality of the punching process and/or to prolong the lifetime of the punching tools, a coating may be applied to the electrical steel prior to the punching operation. In one embodiment, the coating may be a high temperature compatible lubricant with good electrical insulation. However, any coating with good lubrication may be used. The punching process may be configured to compensate for dimensional changes that may occur due to later additional processing, such as deformation due to heat treatment. Since the stator and rotor laminations may be formed from the same semi-processed electrical steel in step 202, in at least one embodiment the stator and rotor laminations may have the same thickness and the same initial composition.

Following the punching process, the processing of the stator and rotor laminations is split into separate stator processing 210 and rotor processing 220. The stator processing 210 may focus primarily on optimizing core loss (P) and permeability ($\mu$) properties. As described above, mechanical properties, such as yield strength, may not be as important for stator laminations since the stator is stationary. At step 212, the stator laminations may be stacked together to form the stator core. An insulating material may be disposed between the laminations to reduce eddy current losses, for example, if the coating applied in step 206 cannot tolerate high temperature annealing in step 214 (described below). The insulating material may be applied as a coating prior to the stacking of the laminations. In at least one embodiment, the insulating material may be a high-temperature compatible material such that subsequent heat treatments will not adversely affect the insulating properties. Suitable insulating materials may include those with good electrical insulation and high temperature compatibility.

At step 214, a second heat treatment process is performed on the stator core (e.g., stacked laminations) only. The second heat treatment may have several purposes. First, the second heat treatment is configured to result in a microstructure (e.g. mean grain size and grain texture) in the stator laminations that will reduce or minimize core loss (P) and improve or maximize permeability ($\mu$). In at least one embodiment, the second heat treatment is configured to provide a mean grain size of 10 to 300 $\mu$m, or any sub-range therein, such as 50 to 250 $\mu$m or 75 to 200 $\mu$m. The optimum grain size may depend on the application and the conditions in which the laminations are used, since core loss has a non-monotonic dependence on grain size. The optimum grain size to minimize core loss is frequency and flux density dependent, due to the competition of the two loss terms: hysteresis and excess loss. In one embodiment, the mean grain size of the electrical steel may be from 50 to 100 $\mu$m. In another embodiment, the mean grain size may be from 100 to 150 $\mu$m. For example, for a frequency of 60 Hz and a flux density of 1.5 T, the optimal grain size for reduced core loss is 150 $\mu$m, while for a frequency of 400 Hz and a flux density of 1 T, the optimal size is 84 $\mu$m.

In addition to providing a microstructure that reduces core loss and enhances permeability, the second heat treatment may also decarburize the electric steel (e.g., if the heat treatment is performed in decarburizing environment, such as a hydrogen and water vapor mixture) and/or reduce or eliminate residual stress. The heat treatment can be done in a protective gas (e.g., nitrogen or an inert gas) or vacuum or decarburizing environment. The heat treatment may have a temperature range of 500-1100° C. and may last for an extended period of time. The heat treatment temperature may be a holding temperature and the heat treatment time may be the time at which the steel is held at the holding temperature or it may be the total time of the heat treatment process (e.g., including any temperature ramp up and ramp down). The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used. A cooling rate may be chosen to reduce or minimize deformation or warping of the single lamination sheet while obtaining improved magnetic properties. As described above, the ending microstructure may depend on the design and working conditions of the motor and may be optimized to minimize core loss and maximize permeability.

Performing the heat treatment step 214 after the stacking and assembly of the stator core in step 212 may reduce the warping of the individual laminations, compared to heat treating the laminations by themselves. Following the second heat treatment, the stacked and assembled stator laminations together form a finished, optimized stator core at step 216. The finished stator core lamination has improved properties compared to a conventionally processed lamination, for example, core loss at 1.0 T, 400 Hz may be less than 15 W/kg, flux density at 5 kA/m may be larger than 1.5 T and yield strength may be larger than 350 MPa.

The rotor processing 220 may focus primarily on optimizing yield strength ($Y_s$), while also improving or maintaining core loss (P) and permeability ($\mu$) properties. As described above, mechanical properties, such as yield strength, may be more important for rotor laminations since the rotor rotates at high speeds. As described above, electric motor power may be increased by increasing motor speed, and high motor speeds require rotors with higher yield strength. At step 222, the rotor laminations may be stacked together to form the rotor core. An insulating material may be disposed between the laminations to reduce eddy current losses, for example, if the coating applied in step 206 cannot tolerate high temperature annealing step 224 (described below). The insulating material may be applied as a coating prior to the stacking of the laminations. In at least one embodiment, the insulating material may be a high-temperature compatible material such that subsequent heat treatments will not adversely affect the insulating properties. Suitable insulating materials may include those with good electrical insulation and high temperature compatibility.

At step 224, a third heat treatment process is performed on the rotor core (e.g., stacked laminations) only. This heat treatment may be different from the second heat treatment 214 (e.g., different temperature and/or time). The third heat treatment may have several purposes. First, the third heat treatment is configured to result in a microstructure (e.g. mean grain size, grain texture) in the electric steel that will improve the yield strength of the rotor laminations. In at least one embodiment, the third heat treatment is configured to provide a mean grain size of 100 μm or less. For example, the mean grain size of the electrical steel may be from 1 to 100 μm, 10 to 100 μm, 25 to 100 μm, 25 to 75 μm, or 25 to 50 μm. The optimal value may reflect a balance between core loss and yield strength requirements. Smaller grain sizes will generally result in increased yield strength, but may increase core loss. In contrast, larger grain sizes will generally result in reduced yield strength, but reduced core loss. In at least one embodiment, the heat treatment 224 is configured to provide a mean grain size in the rotor laminations that is smaller than the mean grain size in the stator laminations. This may provide the rotor core with improved yield strength, relative to the stator core. In contrast, the heat treatment 214 may be configured to provide a mean grain size in the stator laminations that is larger than the mean grain size in the rotor laminations. This may provide the stator core with improved core loss properties, relative to the rotor core. Loss or loss performance may be compared under the same or similar conditions, such as flux density and frequency.

In addition to providing a microstructure that improves yield strength, the third heat treatment may also decarburize the electric steel (e.g., if the heat treatment is performed in decarburizing environment, such as hydrogen and water vapor mixture) and/or reduce or eliminate residual stress. The heat treatment may have a temperature range of 500-1100° C. and may last for an extended period of time. The heat treatment temperature may be a holding temperature and the heat treatment time may be the time at which the steel is held at the holding temperature or it may be the total time of the heat treatment process (e.g., including any temperature ramp up and ramp down). The heat treatment time may vary depending on the properties of the workpiece and/or the heating equipment (e.g., furnace), for example, the dimensions of the steel or the type of furnace being used. Larger pieces may require longer heating times and industrial continuous annealing furnaces may require less time than a static furnace. Accordingly, the heat treatment time may range from up to an hour (e.g. 1 to 60 minutes) to several hours, or longer, depending on the properties of the workpiece and the equipment being used. A larger cooling rate may be chosen for the rotor core, compared to the stator core, to improve mechanical and magnetic properties while minimizing deformation or warping of the single lamination sheet. The final microstructure may depend on the design and working conditions of the motor and may be optimized to maximize mechanical properties.

Performing the heat treatment step 224 after the stacking and assembly of the rotor core in step 222 may reduce the warping of the individual laminations, compared to heat treating the laminations by themselves. Following the third heat treatment, the stacked and assembled stator laminations together form a finished, optimized rotor core at step 226. The finished rotor core lamination has improved properties compared to a conventionally processed lamination, for example, core loss at 1.0 T, 400 Hz may be less than 15 W/kg, flux density at 5 kA/m may be larger than 1.5 T and yield strength may be larger than 350 MPa. At step 230, the optimized stator core and the optimized rotor core may be combined to form an optimized motor core. As described above, the stator core and the rotor core may be individually optimized for a certain application. The stator core may have improved core loss properties relative to the rotor core, for example, due to a larger mean grain size. The rotor core may have improved mechanical properties, such as yield strength, relative to the stator core, for example, due to a smaller mean grain size. The mean grain sizes described above may be throughout the entire lamination or core if the heat treatments are applied to the entire lamination or core.

The heat treatments in step 112 and/or 122 of process 100 and in step 214 and/or 224 of process 200 are not limited to the whole stator/rotor lamination or stator/rotor core, they may also be selectively applied to one or more local areas or portions of each stator and/or rotor lamination or core. The local heat treatment may be achieved by locally heating up the lamination or core using methods such as laser heating and inductive heating. By doing so, the mechanical strength of one or more important regions of the rotor lamination (e.g., rotor bridge) are enhanced, the core loss of one or more important regions of the stator lamination (e.g., stator teeth)

are reduced, and the permeability of one or more important regions of the stator lamination (e.g., stator teeth) are enhanced.

Figure 4:
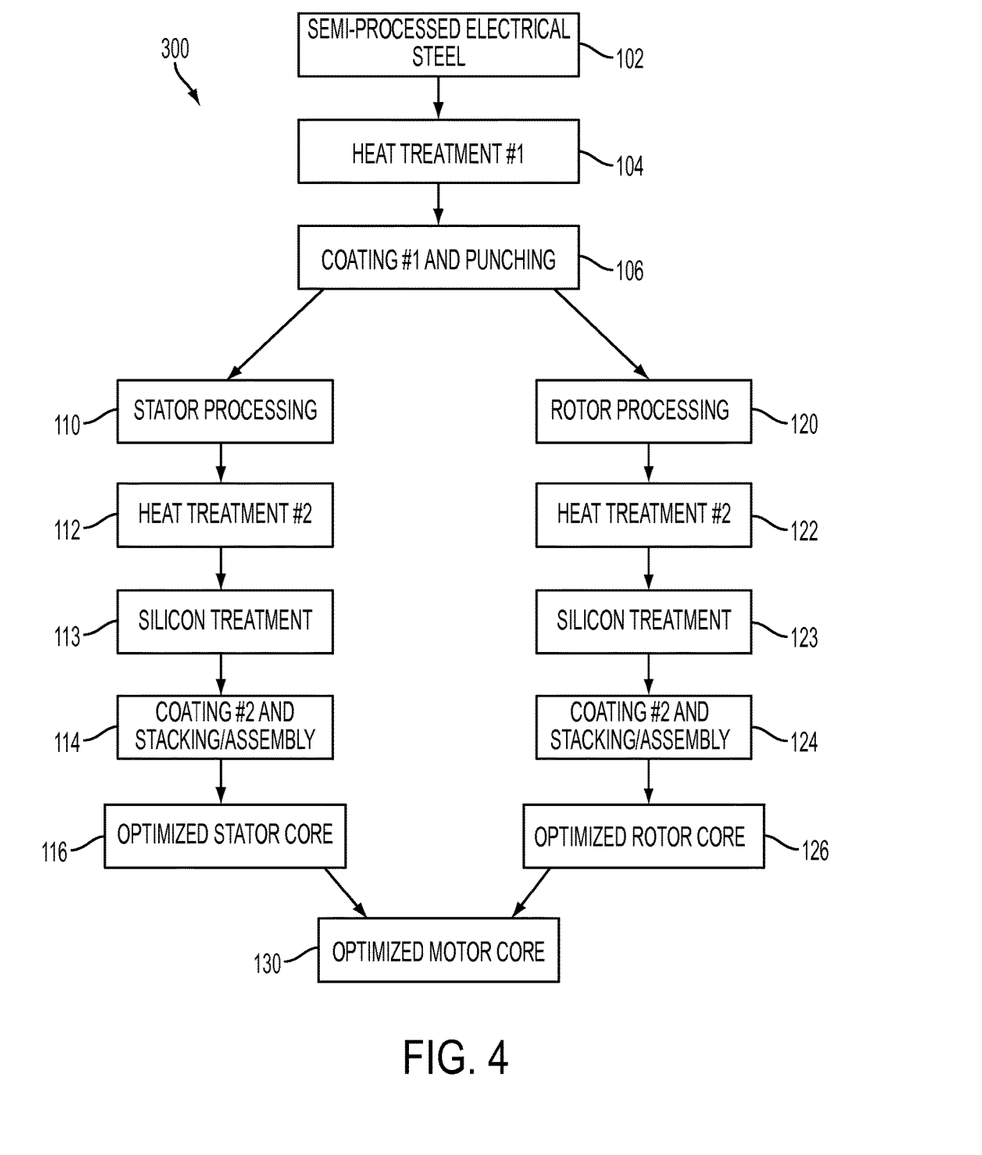
FIG. 4 is a flow diagram of a split manufacturing process for separately processing rotor and stator laminations, including a silicon treatment, according to an embodiment.

In addition to the processes described above, additional steps or processes may be added to the stator and/or rotor processing. Separating the processing of the stator and rotor may allow for targeted additional processing that is not possible in the conventional manufacturing process. With reference to FIG. 4, a manufacturing process 300 is shown in which an additional silicon treatment step 113 is included. Manufacturing process 300 is similar to manufacturing process 100 in FIG. 2, and like numerals represent like steps. Likewise, manufacturing process 300 may be similar to manufacturing process 200, with the addition of a silicon treatment step. In one embodiment, the silicon content of the stator laminations may be increased during the stator processing, resulting a Si concentration up to 7%. For example, a layer of material containing silicon may be applied to the surface of the laminations after punching and silicon may be diffused into the stator laminations during a heat treatment, such as heat treatment 112 or 214 (e.g., silicon treatment 113 is included as part of the heat treatment). Alternatively, a separate heat treatment step 113 specifically for the diffusion of silicon may be performed. While FIG. 4 shows the silicon treatment 113 as occurring between the heat treatment step 112 and the coating and stacking step 114, it may be performed at any suitable time. For example, step 113 may occur prior to step 112.

Other known methods of increasing silicon content may also be performed in the silicon treatment step, such as depositing silicon or silicon compound on a lamination by physical vapor deposition or chemical vapor deposition or coating a layer of silicon or silicon compound on a lamination using a slurry or dry powder. Increasing the silicon content may further reduce the loss of the stator laminations. Furthermore, by increasing the silicon content of the stator laminations after they have been punched, the brittleness and workability issues often associated with high silicon content electrical steel may be avoided.

Increasing the silicon content of stator limitations may be more beneficial than increasing the silicon content of the rotor limitations, since loss reduction is more important for the stator than the rotor. However, the same, or a similar, process of increasing the silicon content described above may also be applied to rotor laminations, since, in addition to reducing loss, silicon addition also increases yield strength. With reference to FIG. 4, a silicon treatment step 123 is shown, which may be similar to the silicon treatment step 113 for the stator laminations. Also similar to step 113, step 123 may occur at other points in the process 300, such as before heat treatment 122. The silicon addition(s) can be applied to the whole stator/rotor lamination surface or only selected areas/portions of the surface, such as regions near teeth for stator laminations to reduce loss or critical local areas/portions of the rotor laminations to increase the mechanical strength of regions of the rotor lamination (e.g., rotor bridge).

In another embodiment, a coating with a different thermal expansion coefficient than the laminations may be applied to the stator laminations to induce tension in the electrical steel. Introducing a small degree of tension may further reduce the loss in the stator due to the contribution of magnetoelastic anisotropy energy. For example, a tension of up to 30 MPa may be induced, such as 1 to 30 MPa, 1 to 20 MPa, 5 to 20 MPa, or about 20 MPa. The coating may be applied as part of the coating during the stacking and assembly steps, such as in steps 114 and 212. Alternatively, a separate step may be included in the process to add a coating that induces tension or to induce tension using other known methods. Similar to increasing the silicon content, inducing tension may be more beneficial to the stator laminations than the rotor laminations, due to loss being relatively more important in the former, but the methods described above for inducing tension may also be applied to rotor laminations. However, the additional centrifugal force due to high speed rotor rotation should be considered when applying such a coating to ensure a net small degree of tension is achieved on the rotor lamination.

The initial material of manufacturing processes 100 and 200 may not be limited to semi-processed electrical steels. As an example, fully processed electrical steel can also be used. Depending on the different requirements for the stator and rotor laminations, additional and separate annealing steps can be performed on fully processed stator and/or rotor laminations after punching to further improve their respective performances. The annealing processes may provide optimized properties for stator and rotor laminations, respectively, through the development of ideal electrical steel microstructures (grain size, grain texture, etc.) and may also reduce or eliminate residual stress. This process is similar to process 100, except that heat treatment #1 in step 104 and coating #1 in step 106 may not be necessary due to the enhanced punchability of fully processed electrical steel. Additional and separate annealing steps can also be performed on stator and/or rotor cores after punching and stacking of fully processed laminations to further improve their respective performances. The annealing processes may provide optimized properties for stator and rotor cores, respectively, through the development of ideal electrical steel microstructures (grain size, grain texture, etc.) and may also reduce or eliminate residual stress. This process is similar to process 200, except that heat treatment #1 in step 204 and coating #1 in step 206 may not be necessary due to the enhanced punchability of fully processed electrical steel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming motor core laminations comprising:
   providing an electrical-steel source having first and second portions;
   punching the electrical-steel source to form stator and rotor laminations from the first and second portions, respectively;
   heat-treating the stator lamination to achieve a first mean grain size of 75-200 μm; and
   separately heat-treating the rotor lamination at different conditions to achieve a second mean grain size of 25-75 μm and less than the first grain size.

2. The method of claim 1, wherein separately heat-treating at different conditions includes heat-treating the rotor lamination at a temperature lower than a stator heat treatment temperature.

3. The method of claim 1, wherein separately heat-treating at different conditions includes holding a stator heat treatment temperature for a longer total time period than a total time period held at a rotor heat treatment temperature, and includes lowering the rotor heat treatment temperature at a higher rate than lowering the stator heat treatment temperature.

4. The method of claim 1 further comprising providing a layer of silicon on at least one of the first and second portions of the electrical-steel source after the punching step, and diffusing the layer by heat-treating the layer to increase a silicon content of the stator laminations, rotor laminations, or both.

5. The method of claim 1 further comprising providing a layer of silicon on at least one of the first and second portions of the electrical-steel source after the punching step, and diffusing the layer during the heat-treating steps to increase a silicon content of the stator laminations, rotor laminations, or both.

6. The method of claim 5, wherein diffusing includes increasing a silicon content in only a portion of the stator lamination, rotor lamination, or both.

7. The method of claim 6, wherein diffusing includes increasing a silicon content only in one or more stator teeth of the stator laminations.

8. The method of claim 1, wherein heat-treating the first portion includes performing a stator heat treatment on only a portion of each stator lamination from the stator laminations after forming.

9. The method of claim 8, wherein performing the stator heat treatment includes performing the stator heat treatment on only on one or more stator teeth of each stator lamination of the stator laminations.

10. The method of claim 1, wherein heat-treating the second portion includes performing a rotor heat treatment on only a portion of each rotor lamination from the rotor laminations after forming.

11. The method of claim 1, wherein the stator laminations after heat-treating have a first core loss and the rotor laminations after heat-treating have a second core loss, the second core loss being greater than the first core loss at a same magnetic field strength and frequency.

12. A method of forming core laminations comprising:
providing an electrical-steel source having first and second portions;
punching the electrical-steel source forming stator and rotor laminations from the first and second portions, respectively;
providing a silicon layer for diffusion on at least one of the first and second portions to increase silicon content;
separately heat-treating the first and second portions to achieve a first mean grain size of 75-200 μm, and a second mean grain size of 25-75 μm, respectively, wherein the second mean grain size is less than the first mean grain size.

13. The method of claim 12, further comprising heat-treating the silicon layer to diffuse the silicon layer into at least one of the first and second portions.

14. The method of claim 12, wherein the heat-treating diffuses the silicon layer to increase the silicon content.

15. The method of claim 12, wherein providing the silicon layer includes diffusing the silicon layer in only a portion of the at least one portion to increase the silicon content in only the portion.

* * * * *